United States Patent [19]

Sugao

[11] Patent Number: 4,598,937
[45] Date of Patent: Jul. 8, 1986

[54] PIPE HAVING A DOUBLE FLARED END

[75] Inventor: Keizo Sugao, Shizuoka, Japan

[73] Assignee: Usui Kokusai Sangyo Kabushiki Kaisha, Shizuoka, Japan

[21] Appl. No.: 665,106

[22] Filed: Oct. 26, 1984

[51] Int. Cl.$^4$ .............................................. F16L 9/14
[52] U.S. Cl. ..................................... 285/55; 285/334.5
[58] Field of Search ................. 285/55, 334.5; 138/109

[56] References Cited

U.S. PATENT DOCUMENTS

| 1,794,955 | 3/1931 | Gordon | 285/334.5 X |
| 1,988,158 | 1/1935 | Brodell | 285/334.5 X |
| 3,722,925 | 3/1973 | Robbins | 285/55 |
| 3,828,823 | 8/1974 | Douglas | 285/55 X |

FOREIGN PATENT DOCUMENTS

| 2060646 | 6/1971 | France | 285/55 |
| 904975 | 9/1962 | United Kingdom | 285/55 |

Primary Examiner—Dave W. Arola
Attorney, Agent, or Firm—Anthony J. Casella; Gerald E. Hespos

[57] ABSTRACT

A pipe assembly comprising a metal pipe having a double flared end and a tube formed from a corrosion resistant material and fitted tightly in the metal pipe. The double flared end includes an inner wall portion defining a seat for a tubular member to which the pipe assembly is connected. The tube has one end held by the inner wall portion. The inner wall portion comprises a conical portion and a cylindrical portion contiguous to the conical portion. The cylindrical portion extends beyond a neck defining the double flared end into the tube and held tightly against the inner surface of the tube.

2 Claims, 2 Drawing Figures

PRIOR ART.

PIPE HAVING A DOUBLE FLARED END

BACKGROUND OF THE INVENTION

1. Field of the Invention

This invention relates to a pipe having a double flared end. More particularly, it relates to an improved construction of the double flared end of a metal pipe having a relatively small inside diameter not exceeding about 30 mm and a small wall thickness not exceeding about 2 mm, containing a resin or rubber tube fitted tightly therein, and adapted for conveying air or gas or a corrosive liquid in an automobile or any of various machines or apparatus.

2. Description of the Prior Art

A pipe assembly of the type to which this invention pertains is disclosed in Japanese Utility Model Application No. 36485/1983 filed on Mar. 14, 1983. It is shown in FIG. 2. It comprises a metal pipe 11 containing a resin or rubber tube 12 therein and having a double flared end 13 defined by a radially inward bend. This bend defines an inner wall portion 15 having an outer surface 14 defining a seat for a mating holder 20. The tube 12 has one end 12' held between the inner wall portion 15 and the outer wall portion of the double flared end 13. The double flared end 13 is held against the holder 20 by a nut 19.

As is obvious from FIG. 2, however, the inner wall portion 15 terminates in a radially inclined or conical plane. The inner wall portion 15 tends to spring back toward its original shape prior to bending and thereby fails to hold the end 12' of the tube 12 properly. When the flared end 13 is bent, the force applied thereto by punching tends to displace the tube 12 axially and thereby create a clearance 16 within the flared end 13. The flared end 13, thus, fails to hold the tube 12 properly. The clearance 16 often allows the fluid to reach the inner surface of the pipe 11 and corrode it.

SUMMARY OF THE INVENTION

It is an object of this invention to provide a pipe assembly having a double flared end which is free from the drawbacks of the prior art as hereinabove pointed out.

This object is essentially attained by employing a metal pipe having an inner wall portion defining a double flared end and lying in a conical plane and a cylindrical plane contiguous thereto and extending axially of the pipe.

DETAILED DESCRIPTION OF THE INVENTION

Figure 1:
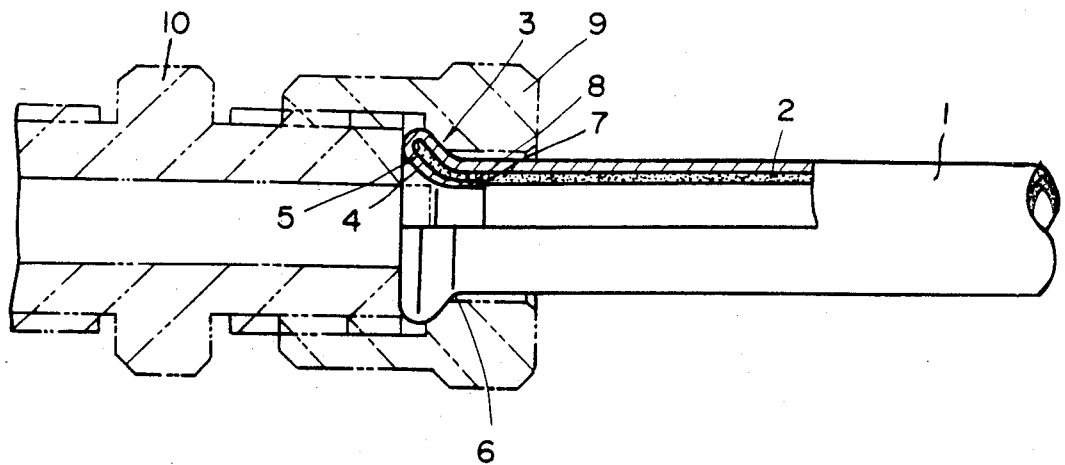
FIG. 1 is a side elevational view, partly in longitudinal section, of a pipe assembly embodying this invention.

Referring to FIG. 1 of the drawing, a pipe assembly embodying this invention comprises a metal pipe 1 having a relatively small inside diameter and a small wall thickness and a resin or rubber tube 2 fitted tightly therein. The metal pipe 1 and the resin or rubber tube 2 are put together by, for example, joint drawing. The metal pipe 1 has a radially outwardly extending double flared end 3 including an inner wall portion 5 having an outer surface 4 which defines a seat for a mating holder 10. The flared end 3 is held against the holder 10 by a nut 9. The tube 2 has one end held by the double flared end 3.

According to a salient feature of this invention, the inner wall portion 5 of the double flared end 3 lies not only in a radially inclined or conical plane, but also in a cylindrical plane contiguous thereto. In other words, the inner wall portion 5 includes a cylindrical portion 7 extending axially into the tube 2 beyond a neck 6 defining the flared end 3. The cylindrical portion 7 is defined by a cylindrical extension 8 having a reduced wall thickness, and held tightly against the inner surface of the tube 2.

Figure 2:
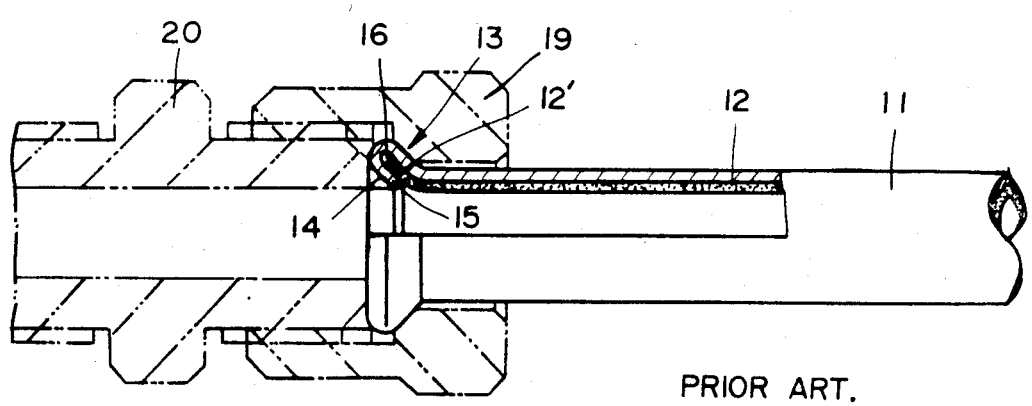
FIG. 2 is a view similar to FIG. 1, but showing the prior art construction as hereinbefore described.

The improved construction hereinabove described prevents any springing back of the inner wall portion 5 and thereby enables the end of the tube 2 to be held effectively by the double flared end 3. When the inner wall portion 5 is formed by bending, the provision of the inner cylindrical extension 7 effectively prevents any axial displacement of the tube 2. No clearance of the kind shown at 16 in FIG. 2 is formed. Therefore, there is no fear of the fluid reaching the inner surface of the metal pipe 1 and corroding it.

What is claimed is:

1. In a pipe assembly comprising a metal pipe having a double flared end and a tube formed from a corrosion resistant material and fitted tightly in said metal pipe, said corrosion resistant material being selected from the group consisting of synthetic resins and rubber, said double flared end of said metal pipe including an outwardly flared outer wall portion and an inner wall portion, said inner wall portion being unitary with said outer wall portion and being defined by a radially inward bend therein such that said inner wall portion is generally parallel to and spaced inwardly from said outer wall portion, said inner wall portion defining a seat for a tubular member to which said pipe assembly is connected, said tube having one end held intermediate said inner wall portion and said outer wall portion of said double flared end, the improvement wherein said inner wall portion comprises a conical portion and a cylindrical portion contiguous to and unitary with said conical portion, said cylindrical portion extending beyond a neck defining said double flared end into said tube and held tightly against the inner surface of said tube, said cylindrical portion having a decreasing wall thickness which is smaller than the wall thickness of the rest of said inner wall portion, whereby the conical and cylindrical portions cooperate to prevent axial displacement of said tube relative to said double flared end.

2. A pipe assembly as set forth in claim 1, wherein said metal pipe has a relatively small inside diameter and a small wall thickness.

* * * * *